United States Patent [19]

Iguchi

[11] Patent Number: 4,916,778
[45] Date of Patent: Apr. 17, 1990

[54] DEVICE FOR SECURING CAR SEAT

[75] Inventor: Tatsuya Iguchi, Toyota, Japan

[73] Assignee: Nifco, Inc., Yokohama, Japan

[21] Appl. No.: 391,007

[22] Filed: Aug. 9, 1989

[30] Foreign Application Priority Data

Aug. 26, 1988 [JP] Japan ............................ 63-111302

[51] Int. Cl.⁴ .......................................... A44B 21/00
[52] U.S. Cl. ........................................ 24/458; 24/457
[58] Field of Search ............... 24/458, 457, 456, 455, 24/458, 459; 297/66, 104, 417; 248/72; 108/55.1; 403/387

[56] References Cited

U.S. PATENT DOCUMENTS

| 435,887 | 9/1890 | Ellithorp | 24/458 |
| 1,761,497 | 6/1930 | Smith | 24/458 |
| 2,038,971 | 4/1936 | Thatcher | 24/458 |
| 3,852,943 | 12/1974 | Healup | 24/459 |

FOREIGN PATENT DOCUMENTS 63-13940 4/1988 Japan .

Primary Examiner—Victor N. Sakran
Attorney, Agent, or Firm—Schwartz & Weinrieb

[57] ABSTRACT

A plastic device for securing an automobile seat to an automobile panel includes a body and a lever arm. The body integrally has a leg-like lower portion open at the top, an upper portion united to the top of the leg-like portion, and upper and lower flange portions extending outwardly in a spaced-apart relation with respect to each other from the respective upper and lower ends of the upper portion. The lever arm is pivotally coupled to the upper and lower flange portions. The leg-like portion has engaging means for cooperating with the lower flange portion so as to clamp a portion of the automobile panel surrounding a hole through which the device is inserted. The upper portion of the body has a side hole. The lever arm is integrally provided with a traverse portion penetrating the side hole and traversing the interior of the upper portion, an operating portion extending away from the traverse portion and projecting outwardly from a space defined between the upper and lower flange portions, and a spring portion in frictional contact with the outer periphery of the upper portion for biasing the traverse portion so as to penetrate the side hole. The traverse portion has an upper portion inclined downwardly toward the free end thereof for engagement with a wire W of the automobile seat whereby the traverse portion will be displaced from its initial position and restored thereto by means of the spring portion so as to lockingly retain the wire portion W and the automobile seat upon the automobile panel.

7 Claims, 2 Drawing Sheets

DEVICE FOR SECURING CAR SEAT

FIELD OF THE INVENTION

This invention relates to a two-member device made of a plastic material for detachably securing the seat section or reclining section of a rear seat of an automobile (hereinafter referred to as "seat" throughout the specification) to an automobile panel.

DESCRIPTION OF THE PRIOR ART

Japanese Utility Model Publication No. 63-13940 discloses a device made of a plastic material for securing a seat. This device comprises a box-like frame to be secured to an automobile panel and a holder disposed within the interior of the frame for holding a U-shaped wire portion depending from the seat.

In this device, the holder disposed within the frame is operable from the outside of the frame such that it can be brought from a closed position, in which the U-shaped wire portion is secured so as to, in turn, fixedly secure the seat, to an open position, in which the seat can be removed by separating the wire portion. Therefore, in such a case as when repairing the automobile the seat can be removed from the automobile body by moving the holder from the closed position to the open position.

However, the holder of this prior art structure has the following drawbacks. Since the structure utilizes a toggle action to change the holder position between the open and closed positions, the holder has many small-thickness hinge portions. These hinge portions reduce the mechanical strength of the holder, and the application of a large force to the seat when the same is disposed in the secured state may cause breakage of the holder at the hinge portions.

In addition, in order to secure the seat by holding the U-shaped wire portion, the holder disposed within the frame is held in the open position, and when it is pushed downwardly as a result of the U-shaped wire portion of the seat being lowered into the frame, it is brought to the closed position by means of the toggle action so as to grasp the wire portion. However, when or if the holder disposed at its closed position is pushed downwardly by means of the wire portion, it cannot in fact grasp the wire portion. It is, however, impossible to check from the outside as to whether or not the holder disposed within the frame is in the closed or open position. It is confirmed that the holder is in the closed position only when it fails to grasp the wire portion despite the fact that it is being pushed downwardly thereby. In this case, it is necessary to bring the holder to the open position and again push the holder downwardly by means of the wire portion. In this case, the efficiency of the operation of securing the seat is reduced.

Furthermore, in order to bring disposed within the holder the frame from the closed position, in which the seat is secured, to the open position, an operating piece projecting downwardly from the lower end of the frame has to be operated. This operation is somewhat cumbersome.

OBJECT OF THE INVENTION

This invention has been accomplished in light of the above, and its object is to provide a device for securing a seat of an automobile, which is not broken when a large force is applied to the secured seat and which has high mechanical reliability.

Another object of the invention is to provide a device for securing a seat of an automobile, which permits a seat-securing operation to be readily accomplished and which permits a reliable operation to be achieved when the device is disposed in its open position and not to be achieved when the device is disposed in its closed position.

SUMMARY OF THE INVENTION

In order to attain the above objects of the invention, there is provided a device for securing a seat of an automobile, which comprises a body made from a plastic material and integrally having a leg-like lower portion open at the top, an upper portion united to the top of the leg-like portion and upper and lower flange portions extending outwardly in a spaced-apart relation with respect to each other from the respective upper and lower ends of the upper portion, and a lever arm made of a plastic material and pivotally coupled to the upper and lower flange portions of the body, the leg-like lower portion of the body having engaging means for cooperating with the lower flange portion so as to clamp an edge portion surrounding a hole defined within a panel, the upper portion having a side hole, the lever arm integrally having a traverse portion penetrating the side hole and traversing the interior of the upper portion, an operating portion extending away from the traverse portion and projecting outwardly from a space defined between the upper and lower flange portions, and a spring portion in frictional contact with the outer periphery of the upper portion, the traverse portion being biased by means of the spring portion so as to penetrate the side hole, the upper surface of the traverse portion having an inclined portion inclined downwardly toward the free end thereof.

With the above device according to the invention, the lever arm is biased so as to be in a closed position, at which the lever arm penetrates the side hole of the upper portion and traverses the interior thereof. In order to secure a seat, a U-shaped wire portion depending therefrom is pushed downwardly into the interior of the upper portion. At this time, the traverse portion is temporarily withdrawn from the side hole against the biasing force of the spring, and after being cleared by means of the lower end of the U-shaped wire portion the traverse portion is again caused to penetrate the side hole by means of the biasing force of the spring. Thus, the seat can be very readily secured. Furthermore, since an end portion of the traverse portion normally penetrates the side hole, even a strong tensile force applied to the seat will not cause breakage of the device or release the securement of the seat.

BRIEF DESCRIPTION OF THE DRAWINGS

The above and other objects and features of the invention will become more apparent from the following detailed description with reference to the accompanying drawings, in which like reference characters designate like or corresponding parts throughout the several views, and wherein.

DETAILED DESCRIPTION OF THE PREFERRED EMBODIMENT

The Figures illustrate an embodiment of the device for securing a seat according to the invention.

Figure 4:
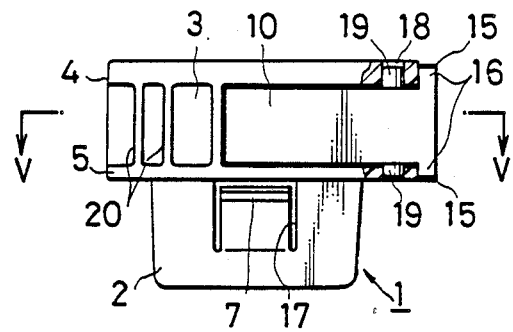
FIG. 4 is a front view showing the device of FIG. 1.

Reference numeral 1 designates a body made of a plastic material and integrally having a leg-like lower portion 2 open at the top, an upper portion 3 united to the top of the leg-like lower portion 2 and upper and lower flange portions 4 and 5 extending radially outwardly in a spaced-apart relation with respect to each other from the upper and lower ends of the upper portion 3. Reference numeral 6 designates a lever arm made of a plastic material pivotally coupled to the upper and lower flange portions 4 and 5 of the body 1 by means of pivot pins 19 as best seen in FIG. 4.

Figure 5:
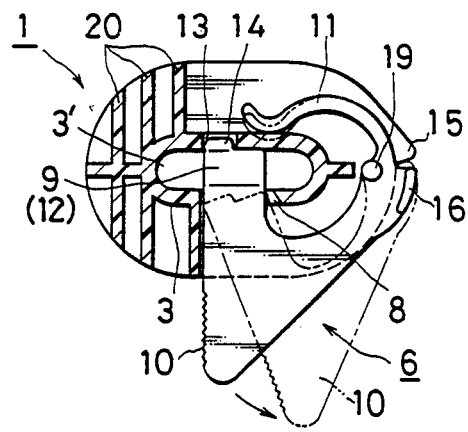
FIG. 5 is a sectional view taken along line V—V in FIG. 4.

The leg-like lower portion 2 of the body 1 has engaging portions 7 which can cooperate with the lower flange portion 5 to clamp an edge portion P' of a panel P surrounding a hole so as to secure the body 1 to the panel P, and the upper portion 3 has a side hole 8 as best seen in FIG. 5.

The lever arm 6 integrally defined a traverse portion 9 normally penetrating the side hole 8 and traversing the interior 3' of the upper portion 3, an operating portion 10 extending away from the traverse portion 9 and projecting outwardly from the space defined between the upper and lower flange portions 4 and 5, and a spring portion 11 in frictional contact with the outer periphery of the upper portion 3, the traverse portion 9 being biased by means of the spring portion 11 so as to penetrate the side hole 8. The upper surface of the traverse portion 9 has an inclined portion 12 inclined downwardly toward the free end of the traverse portion 9 and which serves as a cam surface. The upper portion 3 of the body 1 has a hole 13 disposed opposite the side hole 8. The free end of the traverse portion 9 of the lever arm 6 has a projection 14 normally extending into the hole 13. At least one of the upper and lower flange portions 4 and 5 of the body 1 and the lever arm 6 have respective stoppers 15 and 16 for engaging each other when the traverse portion 9 is withdrawn from the side hole 8 by turning the lever arm 6 against the biasing force of the spring portion 11.

The lower and upper portions 2 and 3 and upper and lower flange portions 4 and 5 of the body 1 are oval within shape. The side hole 8 is formed in a central portion of one of the opposed long side wall portions of the upper portion 3. Each engaging portion 7 is anchorlike in shape and is defined within a central portion of each opposed long side wall portion of the leg-like lower portion 2 by means of an inverted U-shaped slit 17 as best seen in FIG. 4. The upper and lower flange portions 4 and 5 have opposed circular holes 18 formed within their similar semi-circular end portions for pivotally coupling the lever arm 6 to the body 1 by means of the pivot pins 19.

Figure 3:
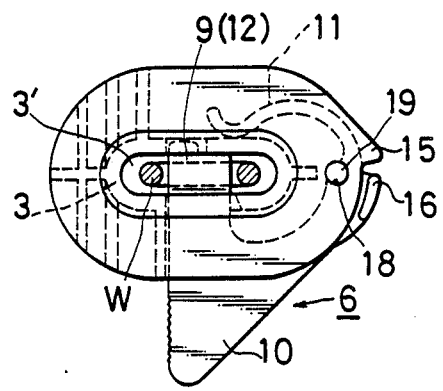
FIG. 3 is a plan view showing the device of FIG. 1.

The lever arm 6 has a thickness slightly smaller than the distance defined between the upper and lower flange portions 4 and 5 of the body 1. The traverse portion 9 of the lever arm 6 penetrates the side hole 8, which is formed within a central portion of one of the opposed long side wall portions of the upper portion 3 as noted above and traverses the interior 3' of the upper portion 3, and its free end normally engages with the inner surface of the other side wall portion. The spring portion 11 is curved, and its free end is in slightly forced contact with the outer surface of the other side wall portion of the upper portion 3 noted above, thus holding the traverse portion 9 in a state of penetrating the side hole 8 as best seen in FIG. 5. The lever arm 6 has such a shape as to surround one of the semi-circular end portions of the upper portion 3 as a whole. A stem portion of the spring portion 11 has the pivot pins or short projections 19 respectively projecting from the top and bottom surfaces thereof so as to project into the circular holes 18. In order to assemble the body and lever arm together, the lever arm 6 is forced into the space between the upper and lower flange portions 4 and 5 while inserting the traverse portion 9 through the side hole 8, and the short projections 19 are fitted within the circular holes 18 of the upper and lower flange portions 4 and 5 by expanding the space therebetween by means of the short projections 19. In this way, the device is assembled as shown by means of the solid lines in FIGS. 3 and 5. In the assembled state, the spring portion 11 is slightly deformed in a compressed state, whereby the traverse portion 9 is biased to assume a state of penetrating the side hole 8.

The panel P, upon which the device is to be mounted, is formed with a hole corresponding to the sectional shape of the leg-like lower portion 2, and the leg-like lower portion 2 is forced downwardly so as to be inserted through the hole of the panel P until the lower surface of the lower flange portion 5 is brought into contact with the upper surface of the panel P. During this operation, the pair of engaging portions 7 projecting obliquely upwardly from the leg-like lower portion 2 are forced radially inwardly by means of the edge portion P' of the hole as they pass through the hole. When they clear the hole, the portions are restored to their initial state and cooperate with the lower flange portion 5 so as to clamp the edge portion P' surrounding the hole in order to secure the body 1 to the panel P.

Figure 1:
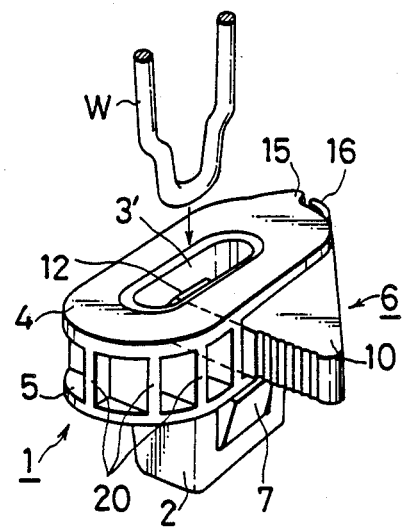
FIG. 1 is a perspective view showing an embodiment of the device for securing a seat according to the invention.
Figure 2:
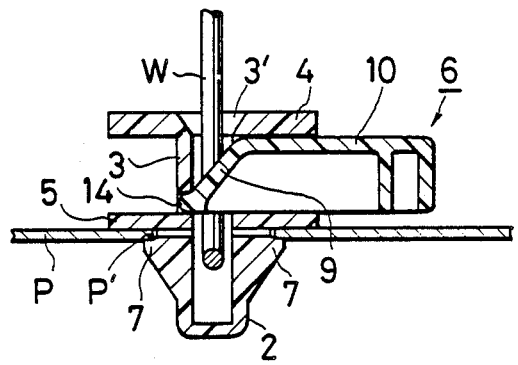
FIG. 2 is a sectional view showing the device of FIG. 1, with a seat secured thereby.

In order to secure the seat, a U-shaped wire portion W depending therefrom is pushed downwardly into the interior 3' of the upper portion 3 (as shown by means of the arrow in FIG. 1). As a result, the wire portion W engages down the inclined portion 12 of the traverse portion 9, and the traverse portion 9 is displaced in a radially outward direction so as to be withdrawn from the side hole 8 by means of a component of force applied to the inclined portion 12. At this time, the lever arm 6 is pivoted about the short projections 19 in the counterclockwise direction as shown by means of the arrow in FIG. 5, and the spring portion 11 is further compressed so as to store spring force. When the lower end of the wire portion W being pushed downwardly clears the free end of the traverse portion 9, the lever arm 6 is pivoted back in the clockwise direction by means of the restoring force of the spring portion 11 tending to restore the initial assembled state, and the traverse portion 9 again assumes the initial state of traversing the interior 3' of the upper portion 3. In this state, the seat cannot be raised from the automobile panel P because the lower end of the U-shaped wire portion W is locked beneath the traverse portion 9.

In order to remove the seat for purposes of repair or the like, the traverse portion 9 is withdrawn from the side hole 8 as shown by means of the phantom line of FIG. 5 by pivoting the lever arm 6 in the counterclockwise direction as shown by means of the arrow in FIG. 5 against the biasing force of the spring portion 11 with a finger applied to the operating portion 10. In this state, the seat may be raised so as to withdraw the U-shaped wire portion W from the interior 3' of the upper portion 3.

In order to facilitate the assembly of the body 1 and lever arm 6, the free end of each short projection 19 may be formed with an inclined surface inclined toward each flange portion in the direction of inserting the lever arm 6 such that the end of the inclined surface nearer the flange portion is at the same level as the outer surface of the flange portion.

Figure 6:
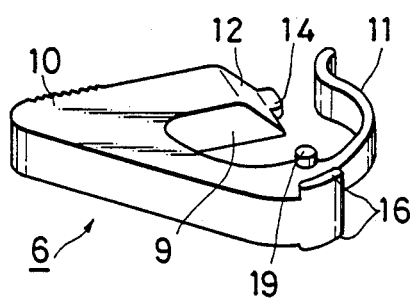
FIG. 6 is a perspective view showing a lever arm of the device of FIG. 1.

Furthermore, it is recommended to provide the upper portion 3 of the body 1 with a hole 13 opposite to the side hole 8 and to provide the free end of the traverse portion 9 of the lever arm 6 with a projection 14 which extends into the hole 13 when the traverse portion 9 is caused to penetrate the side hole 8 and traverse the interior 3' of the upper portion 3. By so doing, if an upward force should be applied to the secured seat so that the lower end of the U-shaped wire portion W tends to pull the traverse portion 9 upwardly with a strong force, the traverse portion 9 will be able to resist the pulling force. The projection 14 need not be provided over the entire width of the traverse portion 9 but may be provided only over part of the width as shown in FIG. 6.

Furthermore, when the traverse portion 9 is withdrawn from the side hole 8 by pivoting the operating portion 10 of the lever arm 6 in the counterclockwise direction as shown by means of the phantom line in FIG. 5 for removing the seat, the counterclockwise rotation of the lever arm 6 is suitably restricted by means of the engagement of the stopper 15 outwardly extending from at least one of the upper and lower flange portions 4 and 5 and the stopper 16 provided upon the lever arm 6. By so doing, it is possible to prevent breakage of the spring portion 11 of the lever arm 6.

The upper and lower flange portions 4 and 5 are suitably reinforced by means of reinforcement walls 20 united to both of them such that the insertion and movement of the lever arm 6 is not interfered with.

In the illustrated embodiment, the flange portions 4 and 5 are provided with the circular holes 18 and the lever arm 6 with the short projections 19 to pivotally couple the lever arm 6 to the flange portions 4 and 5. Conversely, the lever arm may be formed with circular holes and the opposing surfaces of the flange portions 4 and 5 with short projections.

In the above embodiment, the traverse portion 9 of the lever arm 6 is biased so that it is normally in a closed position, that is, it penetrates the side hole 8 and traverses the interior 3' of the upper portion 3, and the upper surface of the traverse portion 9 has the inclined portion 12 inclined downwardly toward the free end thereof. Therefore, by forcing the U-shaped wire portion W downwardly into the interior 3' of the upper portion 3, the traverse portion 9 of the lever arm 6 is displaced in the radially outward direction so as to be withdrawn from the side hole 8 against the biasing force of spring portion 11, and when the lower end of the U-shaped wire portion W being pushed downwardly clears the traverse portion 9, the traverse portion 9 is restored to the closed position by means of the biasing force of the spring portion 11, thus securing the seat. Thus, the seat can be secured without the need of considering whether the traverse portion 9 of the lever arm 6 is in the closed or open position. The operation efficiency of the seat securement process can therefore be extremely improved.

The seat can be removed by withdrawing the traverse portion 9 from the side hole 8 of the upper portion 3 against the biasing force of the spring portion 11 by operating the operating portion 10 of the lever arm 6. This operation can be readily performed because the lever arm 6 is interposed between the upper and lower flange portions 4 and 5 of the body 1 and is located upon the automobile panel. Furthermore, since the biasing force which enables the traverse portion 9 to penetrate the side hole 8 of the upper portion 3 is provided by means of the spring portion 11 integrally provided upon the lever arm 6, there is no need of using any separate spring member such as a coil spring, and the device may consist of only two members, that is, the body and lever arm.

Obviously, many modifications and variations of the present invention are possible in light of the above teaching. It is therefore to be understood that within the scope of the appended claims, the present invention may be practiced otherwise than as specifically described herein.

What is claimed is:

1. A device for securing a seat of a car to a support panel, comprising:
   a body made of a plastic material and integrally having a leg-like lower portion open at the top, an upper portion united to said top of said leg-like portion, and upper and lower flange portions extending outwardly in a spaced-apart relation with respect to each other from the respective upper and lower ends of said upper portion; and
   a lever arm made of a plastic material and pivotally coupled to said upper and lower flange portions of said body,
   said leg-like lower portions of said body having engaging means for cooperating with said lower flange portion so as to clamp an edge portion surrounding a hole defined within said support panel so as to secure said body to said support panel, said upper portion having a side hole,
   said lever arm integrally having a traverse portion penetrating said side hole and traversing the interior of said upper portion, an operating portion extending away from said traverse portion and projecting outwardly from a space defined between said upper and lower flange portions, and a spring portion in frictional contact with the outer periphery of said upper portion, said traverse portion being biased by said spring portion so as to penetrate said side hole, the upper surface of said traverse portion having an inclined portion inclined downwardly toward the free end thereof.

2. The device according to claim 1, wherein said upper portion of said body has a hole opposite said side hole, the free end of said traverse portion of said lever arm normally extending into said hole.

3. The device according to claim 1, wherein at least one of said upper and lower flange portions of said body and said lever arm have respective stoppers to engage with each other when said traverse portion is withdrawn from said side hole by turning said lever arm against the biasing force of said spring portion.

4. The device as set forth in claim 1, wherein:

said traverse portion, said operating portion, and said spring portion of said lever arm integrally comprise a single piece component of said device.

5. The device as set forth in claim 1, further comprising:
vertically oriented slot means, intersecting said side hole of said upper portion, defined within said upper portion for receiving a dependent wire portion of said car seat such that when said wire portion of said car seat is inserted within said vertically oriented slot means of said upper portion of said body, said wire portion engages said inclined portion of said traverse portion of said lever arm so as to move said traverse portion of said lever arm out of said side hole of said upper portion, against the biasing force of said spring portion, so as to permit said wire portion to fully enter said vertically oriented slot means whereupon said wire portion clearing said traverse portion of said lever arm, said traverse portion of said lever arm re-enters said side hole of said upper portion, under the influence of said biasing force of said spring portion, so as to lockingly retain said wire portion of said car seat within said vertically oriented slot means.

6. A device as set forth in claim 1, wherein:
said engaging means of said lower portion of said body comprises cantilevered resilient elements disposed upon opposite sidewalls of said lower portion of said body.

7. A device as set forth in claim 1, further comprising:
pivot pins defined upon upper and lower surfaces of said lever arm; and
recess means defined within said upper and lower flange portions of said body for pivotably receiving and housing said pivot pins of said lever arm.

* * * * *